(12) United States Patent
Tajima et al.

(10) Patent No.: US 9,319,927 B2
(45) Date of Patent: Apr. 19, 2016

(54) COMMUNICATION CONTROL APPARATUS, MOBILE STATION, AND COMMUNICATION CONTROL METHOD

(71) Applicant: FUJITSU LIMITED, Kawasaki-shi, Kanagawa (JP)

(72) Inventors: Yoshiharu Tajima, Yokohama (JP); Kazuaki Ando, Shibuya (JP); Michiharu Nakamura, Yokosuka (JP)

(73) Assignee: FUJITSU LIMITED, Kawasaki (JP)

( * ) Notice: Subject to any disclaimer, the term of this patent is extended or adjusted under 35 U.S.C. 154(b) by 71 days.

(21) Appl. No.: 14/285,113

(22) Filed: May 22, 2014

(65) Prior Publication Data

US 2014/0370877 A1    Dec. 18, 2014

(30) Foreign Application Priority Data

Jun. 13, 2013  (JP) .................. 2013-124983

(51) Int. Cl.
*H04W 28/02*  (2009.01)
*H04L 29/08*  (2006.01)

(52) U.S. Cl.
CPC ........... *H04W 28/0231* (2013.01); *H04L 67/06* (2013.01); *H04L 67/322* (2013.01)

(58) Field of Classification Search
CPC . G08G 1/0104; G08G 1/0129; G08G 1/0968; H04J 14/026; H04J 14/0275; H04J 14/0279; H04J 14/0201; H04L 45/00; H04L 45/245; H04L 41/0836; H04L 41/147; H04L 43/04; H04L 47/41; H04L 47/762; H04L 5/06; H04W 16/14; H04W 28/0231; H04W 28/042; H04W 28/085; H04W 36/14; H04W 48/18; H04W 52/343; H04W 52/346; H04W 84/10; G06F 11/0754
See application file for complete search history.

(56) References Cited

U.S. PATENT DOCUMENTS

2002/0093976 A1  7/2002  Razoumov et al.
2006/0013128 A1  1/2006  Connor et al.
(Continued)

FOREIGN PATENT DOCUMENTS

| JP | 2002-262262 | 9/2002 |
| JP | 2004-297479 | 10/2004 |
| JP | 2010-213338 | 9/2010 |

OTHER PUBLICATIONS

USPTO, [Mastrodonato] Non-Final Rejection, Sep. 25, 2015, in co-pending U.S. Appl. No. 14/271,026 [pending].
(Continued)

*Primary Examiner* — Nizar Sivji
(74) *Attorney, Agent, or Firm* — Fujitsu Patent Center (57) ABSTRACT

A communication control apparatus includes a communication quality determining unit, a rank value calculating unit, and a download control unit. The communication quality determining unit acquires wireless communication qualities of a plurality of mobile stations. The rank value calculating unit calculates a reference value to determine mobile stations to be data download destinations by using the wireless communication qualities acquired by the acquiring unit, compares the reference values of the respective mobile stations at a first time point, and determines mobile stations to be the data download destinations in order from a mobile station whose reference value is the highest based on results of the comparison. The download control unit downloads data to the mobile stations determined as the data download destinations by the rank value calculating unit.

5 Claims, 6 Drawing Sheets

(56) References Cited

U.S. PATENT DOCUMENTS

2006/0153216 A1    7/2006  Hosein et al.
2013/0339530 A1*  12/2013  Nishioka ................. 709/226

OTHER PUBLICATIONS

USPTO, [Mastrodonato], Final Rejection mailed on Dec. 30, 2015 in co-pending U.S. Appl. No. 14/271,026 [pending].

* cited by examiner

COMMUNICATION CONTROL APPARATUS, MOBILE STATION, AND COMMUNICATION CONTROL METHOD

CROSS-REFERENCE TO RELATED APPLICATION

This application is based upon and claims the benefit of priority of the prior Japanese Patent Application No. 2013-124983, filed on Jun. 13, 2013, the entire contents of which are incorporated herein by reference.

FIELD

The embodiments discussed herein are related to a communication control apparatus, a mobile station, and a communication control method.

BACKGROUND

In recent years, with the development of wireless communication technologies, a wireless communication technology based on a new system such as Long Term Evolution (LTE) or LTE Advanced, in addition to a related wireless communication system such as a Wideband-Code Division Multiple Access (W-CDMA), has been in widespread use. In the field of wireless communication, various technologies are being developed to efficiently use limited wireless resources between mobile stations and base stations. As one of such technologies, for example, there is a technology to acquire a wireless communication quality of each of predetermined areas in advance, store the wireless communication qualities in a control device provided on a higher level than a base station, and cause the control device to control wireless communication between the base station and mobile stations so that the mobile stations perform communication in only areas with good communication qualities based on data of the acquired communication qualities. In this technology, it becomes possible to enable operators of the wireless communication to efficiently use the wireless resources, and enable users to save power consumption of the mobile stations.

Patent Document 1: Japanese Laid-open Patent Publication No. 2010-213338

Patent Document 2: Japanese Laid-open Patent Publication No. 2002-262262

The control device as described above sets a plurality of grid areas by dividing a service area of the base station, and collects information, such as a signal-to-interference ratio (SIR), indicating the wireless communication quality for each of the grids in advance. When a mobile station requests download of data or the like, the control device compares the wireless communication quality measured by the mobile station with the wireless communication quality of the grid in which the mobile station is located, and determines whether to perform the download to the mobile station based on a result of the comparison. For example, if the SIR of the mobile station is equal to or greater than a threshold, the control device determines that the mobile station has an adequate wireless communication quality to perform the download, and determines to perform the download. However, in the determination process as described above, wireless signaling is needed to control the download; therefore, the control device needs to process signaling that occurs in a mobile station every time the mobile station requests download. This prevents efficient use of wireless resources.

SUMMARY

According to an aspect of an embodiments, a communication control apparatus includes: an acquiring unit that acquires wireless communication qualities of a plurality of mobile stations; a determining unit that calculates, for each of the mobile stations, a reference value to determine mobile stations to be data download destinations by using the wireless communication qualities acquired by the acquiring unit, compares the reference values of the respective mobile stations at a first time point, and determines mobile stations to be the data download destinations in order from a mobile station whose reference value is the highest based on results of the comparison; and a control unit that downloads data to the mobile stations determined as the data download destinations by the determining unit.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Preferred embodiments will be explained with reference to accompanying drawings. The communication control apparatus, the mobile station, and the communication control method according to the present invention are not limited by the embodiments below.

Figure 1:
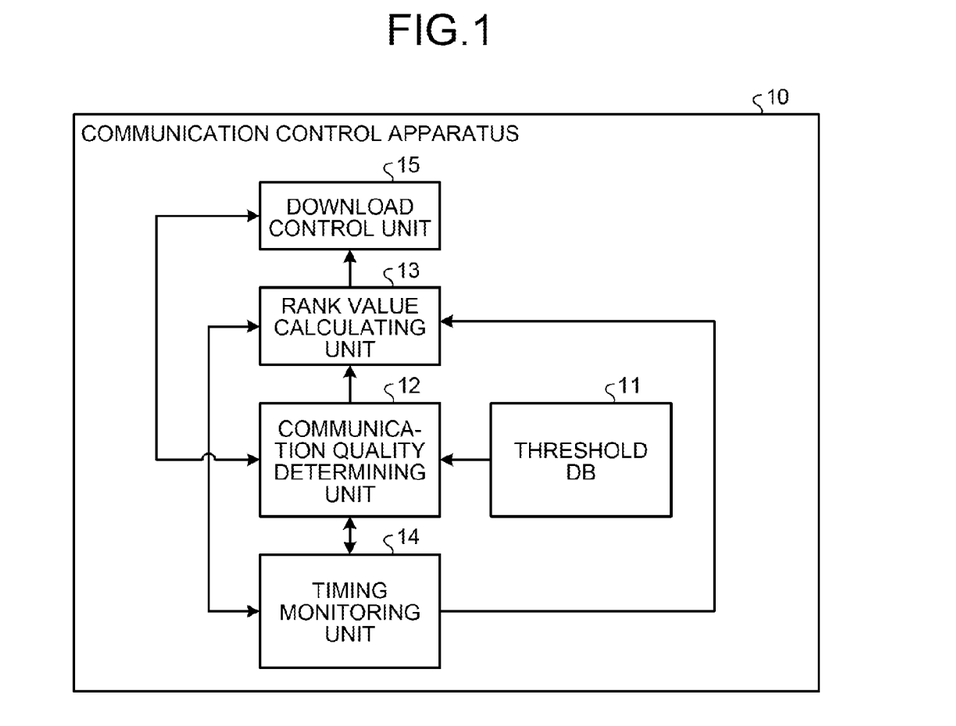
FIG. 1 is a block diagram of a functional configuration of a communication control apparatus.

A configuration of a communication control apparatus according to an embodiment of the present invention will be explained below. FIG. 1 is a block diagram of a functional configuration of a communication control apparatus 10. As illustrated in FIG. 1, the communication control apparatus 10 includes a threshold database (DB) 11, a communication quality determining unit 12, a rank value calculating unit 13, a timing monitoring unit 14, and a download control unit 15. All of the units are connected to one another so as to be able to input and output signals and data unidirectionally or bidirectionally.

The threshold DB 11 stores therein, for each of pieces of location information on mobile stations, a threshold to determine whether to set a rank value to "1" indicating download-ON for the mobile stations. The communication quality determining unit 12 acquires the threshold corresponding to the location information notified by a mobile station 20 by referring to the threshold DB 11, and thereafter determines whether a downlink wireless communication quality (for example, SIR) of the mobile station 20 is equal to or greater than the threshold.

If the wireless communication quality is equal to or greater than the threshold, the rank value calculating unit 13 sets "1" as an initial value f(0) of the rank value indicating download-ON for the mobile station 20. Thereafter, the rank value calculating unit 13 calculates a rank value f(t) based on a predetermined calculation formula and updates the rank value. In contrast, if the wireless communication quality of the mobile station 20 is smaller than the threshold, the rank value calculating unit 13 sets "0" as a rank value indicating download-OFF. When determining a mobile station that serves as a destination to which a resource for download is allocated, the rank value calculating unit 13 compares the rank values of the respective mobile stations at this time point (hereinafter, referred to as a "determination timing"). The rank value calculating unit 13 selects, as download targets, a predetermined number of mobile stations from among the mobile stations with higher rank values based on results of the comparison.

The timing monitoring unit 14 measures, for each of the mobile stations, an elapsed time t from a time point at which the initial value (1 or 0) of the rank value is set (hereinafter, referred to as a "set timing") based on the wireless communication quality notified by each of the mobile stations. The download control unit 15 downloads data to each of the mobile stations selected as the download targets based on results of the determination of the mobile stations to be the download targets obtained by the rank value calculating unit 13.

Figure 2:
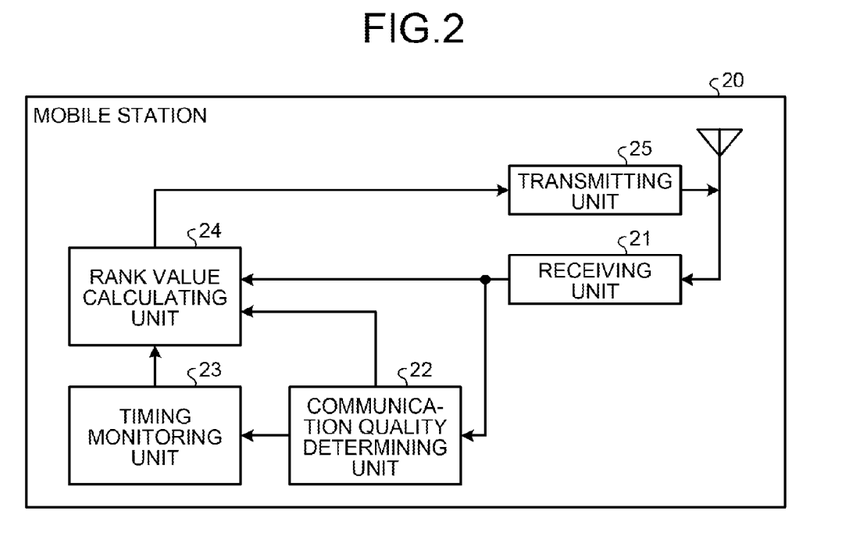
FIG. 2 is a block diagram of a functional configuration of a mobile station.

The rank values may be calculated by the mobile station 20. FIG. 2 is a block diagram of a functional configuration of the mobile station 20. As illustrated in FIG. 2, the mobile station 20 includes a receiving unit 21, a communication quality determining unit 22, a timing monitoring unit 23, a rank value calculating unit 24, and a transmitting unit 25. All of the units are connected to one another so as to be able to input and output signals and data unidirectionally or bidirectionally.

The receiving unit 21 measures a wireless communication quality, such as the SIR, of the mobile station 20. The communication quality determining unit 22 compares the threshold and the wireless communication quality at the set timing based on the threshold notified by the communication control apparatus 10. The timing monitoring unit 23 measures an elapsed time t from the time point at which the comparison is performed (corresponding to the set timing as described above).

The rank value calculating unit 24 sets the initial value f(0) of the rank value to "1" corresponding to download-ON when the measured wireless communication quality is equal to or greater than the threshold based on a result of the comparison, and sets to "0" corresponding to download-OFF when the measured wireless communication quality is smaller than the threshold. The rank value calculating unit 24 calculates a rank value at the determination timing notified by the communication control apparatus 10 based on a predetermined calculation formula. The transmitting unit 25 transmits the rank value calculated by the rank value calculating unit 24 to the communication control apparatus 10.

Figure 3:
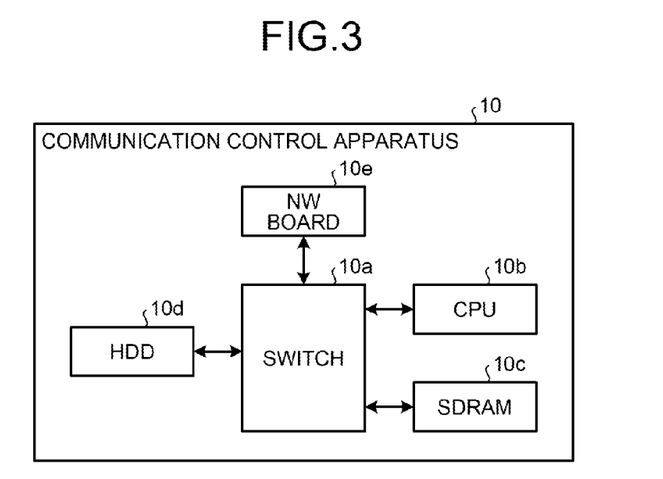
FIG. 3 is a block diagram of a hardware configuration of the communication control apparatus.

Next, hardware configurations of the communication control apparatus 10 and the mobile station 20 will be explained. FIG. 3 is a block diagram of the hardware configuration of the communication control apparatus 10. As illustrated in FIG. 3, in the communication control apparatus 10, a central processing unit (CPU) 10b, a synchronous dynamic random access memory (SDRAM) 10c, a hard disk drive (HDD) 10d, and a network (NW) board 10e are connected to one another via a switch 10a so as to be able to input and output various types of signals and data. Regarding a correspondence relationship between the functional configuration and the hardware configuration of the communication control apparatus 10, for example, the threshold DB 11 of the communication control apparatus 10 is implemented by the HDD 10d. Furthermore, the communication quality determining unit 12, the rank value calculating unit 13, and the timing monitoring unit 14 are implemented by, for example, the CPU 10b. Moreover, the download control unit 15 is implemented by, for example, the CPU 10b and the NW board 10e.

Figure 4:
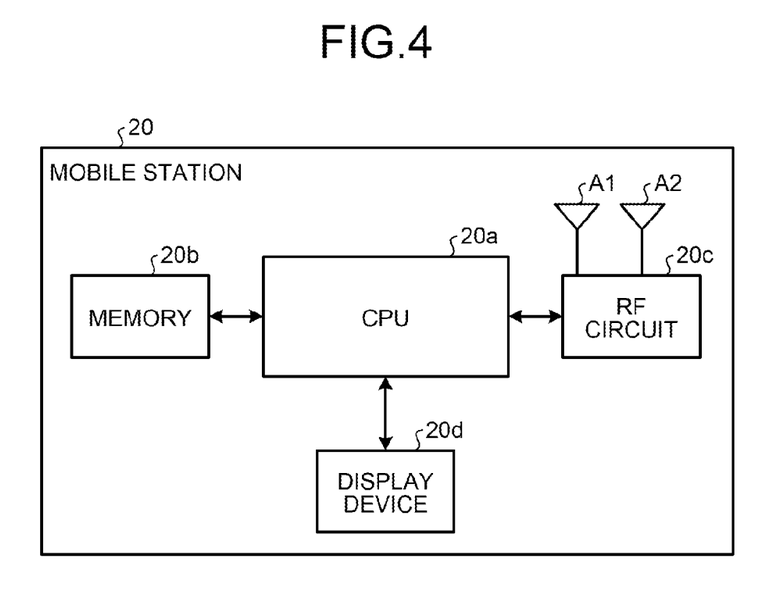
FIG. 4 is a block diagram of a hardware configuration of the mobile station.

The mobile station 20 is implemented by, for example, a mobile terminal, such as a smartphone. FIG. 4 is a block diagram of the hardware configuration of the mobile station 20. As illustrated in FIG. 4, the mobile station 20 includes, as hardware, a CPU 20a, a memory 20b, a radio frequency (RF) circuit 20c, and a display device 20d. The RF circuit 20c includes antennas A1 and A2. The memory 20b is, for example, a random access memory (RAM) such as an SDRAM, a read only memory (ROM), or a flash memory. The display device 20d is, for example, a liquid crystal display (LCD) or an electroluminescence (EL). Regarding a correspondence relationship between the functional configuration and the hardware configuration, the units other than the receiving unit 21 and the transmitting unit 25 from among the functional units illustrated in FIG. 2 are implemented by an integrated circuit, such as the CPU 20a. Furthermore, the receiving unit 21 and the transmitting unit 25 are implemented by the RF circuit 20c.

Next, operation performed by the communication control apparatus 10 according to the embodiment will be explained. As premises for the explanation of the operation, in the explanation below, a timing at which a value (initial value) serving as a starting point of the rank value of each of the mobile stations is set will be referred to as the "set timing", and a timing at which the rank values of the respective mobile stations are compared with one another will be referred to as the "determination timing", in the same manner as described above.

Figure 5:
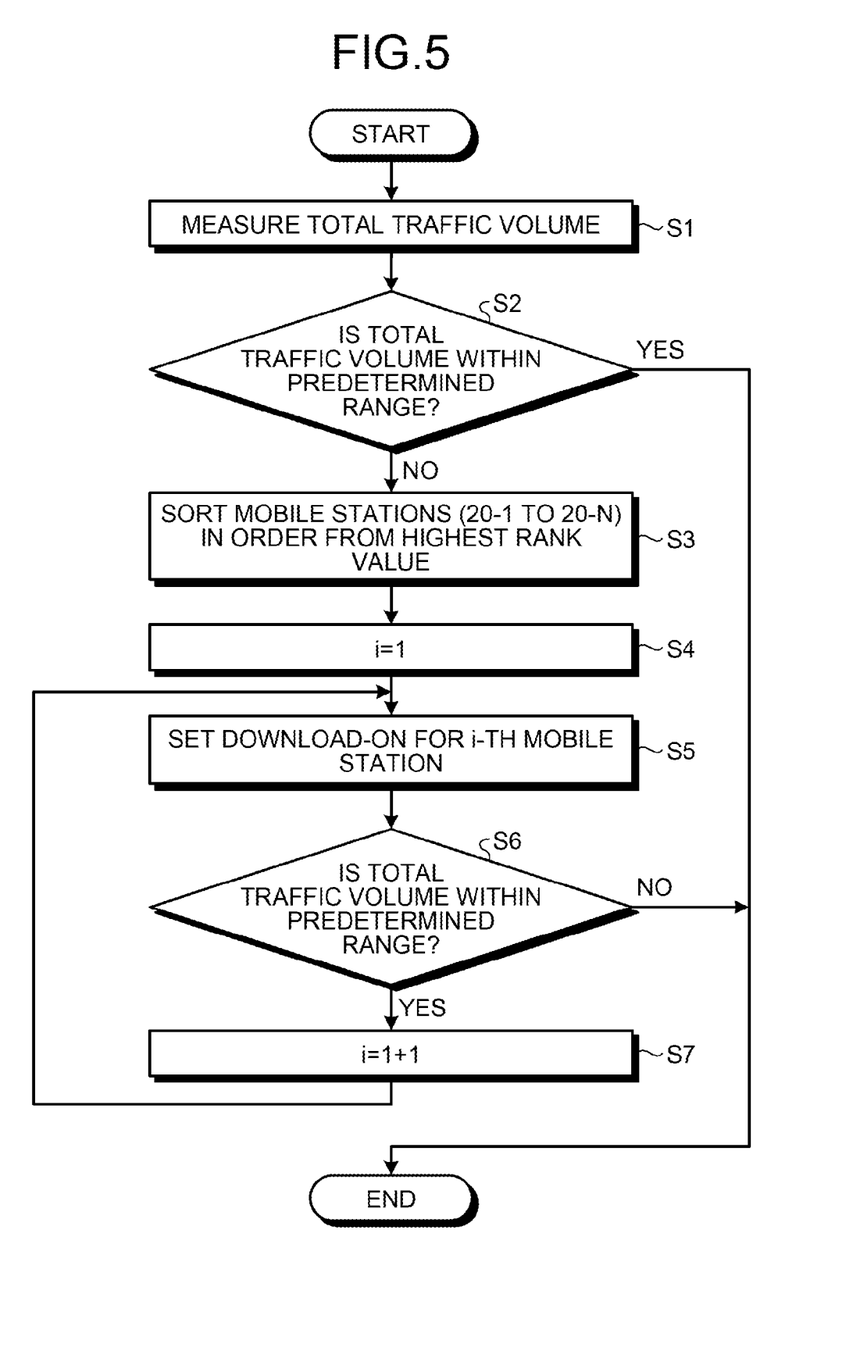
FIG. 5 is a flowchart for explaining operation of the communication control apparatus.

FIG. 5 is a flowchart for explaining the operation performed by the communication control apparatus 10. At S1, the download control unit 15 of the communication control apparatus 10 measures a total traffic volume caused by download to all of the mobile stations including the mobile station 20. If the total traffic volume falls within the limit of a predetermined volume (for example, 100 megabytes (MB)) allowed by the network based on a result of the measurement (YES at S2), the download control unit 15 determines that the download to all of the accommodated mobile stations is possible, and terminates the process.

If the total traffic volume measured at S1 exceeds the predetermined volume allowed by the network based on the result of the measurement (NO at S2), the download control unit 15 of the communication control apparatus 10 sets download-OFF for some of the mobile stations among the accommodated mobile stations. Specifically, the download control unit 15 first sorts mobile stations 20-1 to 20-N to be candidates for the download targets, in descending order from the highest rank value at the determination timing (S3). Incidentally, N is a natural number.

At S4, the download control unit 15 of the communication control apparatus 10 sets a value i for identifying each of the mobile stations 20-1 to 20-N to be the candidates for the download targets to "1" as the initial values. At S5, the download control unit 15 determines the i-th mobile station as a mobile station to be a destination to which contents data is downloaded, and sets download-ON for the mobile station.

At S6, the download control unit 15 of the communication control apparatus 10 again determines whether the total traffic volume at a current time point falls within the limit of the predetermined volume (for example, 100 MB) allowed by the network. If the total traffic volume obtained after the i-th mobile station is added as the download destination does not exceed the limit of the predetermined volume allowed by the network based on a result of the determination (YES at S6), the download control unit 15 adds one to the value i such that i=i+1 (S7). Thereafter, the download control unit 15 repeats a series of the processes from S5 to S7 as described above until the total traffic volume obtained after a mobile station in a download-ON state is added exceeds the predetermined volume.

At a time point at which the total traffic volume exceeds the predetermined volume (NO at S6), the communication control apparatus 10 stops adding a mobile station of the download target and terminates the series of the processes.

Figure 6:
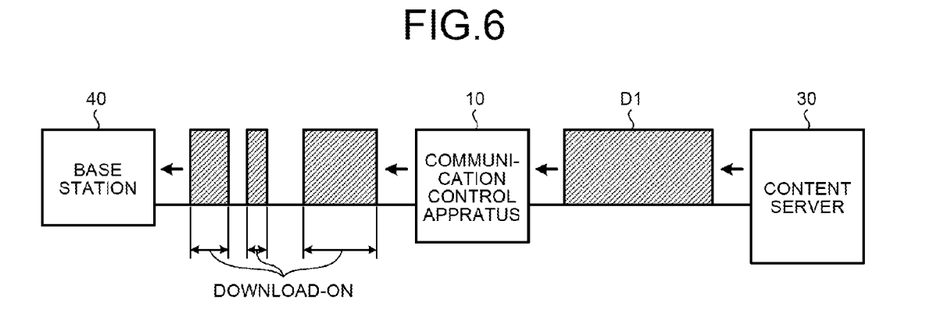
FIG. 6 is a diagram for explaining an overview of control of download between a content server and a base station.

Next, control of download by the communication control apparatus 10 will be described in detail with reference to FIG. 6 to FIG. 8. FIG. 6 is a diagram for explaining an overview of the control of download between a content server 30 and a base station 40. As illustrated in FIG. 6, the communication control apparatus 10 relays contents data D1 as a downloading object distributed by the content server 30, and transmits the contents data D1 to the base station 40. Before the transmission, the communication control apparatus 10 determines whether download is ON or OFF for each of the mobile stations based on the calculated rank value of each of the mobile stations. The communication control apparatus 10 transfers the contents data D1 to only the mobile station (for example, the mobile station 20) for which download-ON is set.

In other words, the communication control apparatus 10 newly sets an intermediate state regardless of whether the state is download-ON or download-OFF, express the intermediate state by the rank value, and preferentially allocates resources for download to the mobile stations in order from the mobile station with the highest rank value. Therefore, the mobile stations to be the destinations to which the contents data D1 is downloaded can be narrowed down. Consequently, as compared to the related method in which data is downloaded to all of mobile stations that have issued requests, it becomes possible to efficiently allocate the resources for download. As a result, it becomes possible to improve the use efficiency of the wireless resources.

Figure 7:
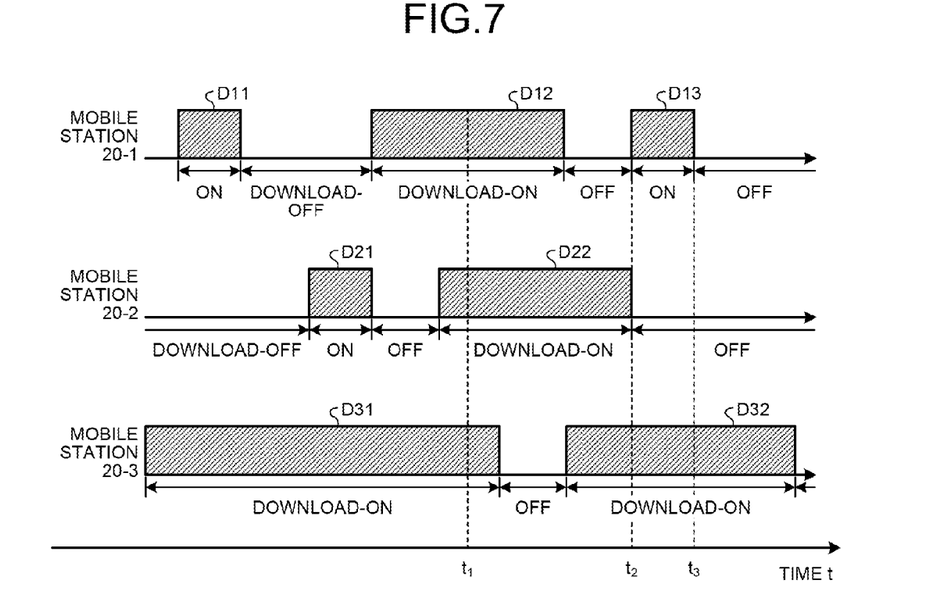
FIG. 7 is a diagram for explaining a related control of download.

FIG. 7 is a diagram for explaining related control of download. FIG. 8 is a diagram for explaining control of download according to the embodiment. As illustrated in FIG. 7, in the related control of download, all of the mobile stations 20-1 to 20-3 may be in the download-ON states at the same time as in the case of time $t_1$. In this case, it may become impossible to allocate adequate resources to all of the mobile stations 20-1 to 20-3 depending on the amount of wireless resources that the network can allocate. Furthermore, a minimum time unit (signaling cycle) for the download-ON state becomes short as in the case of a time $t_3-t_2$ for example, and the frequencies of signaling increase proportionally.

Figure 8:
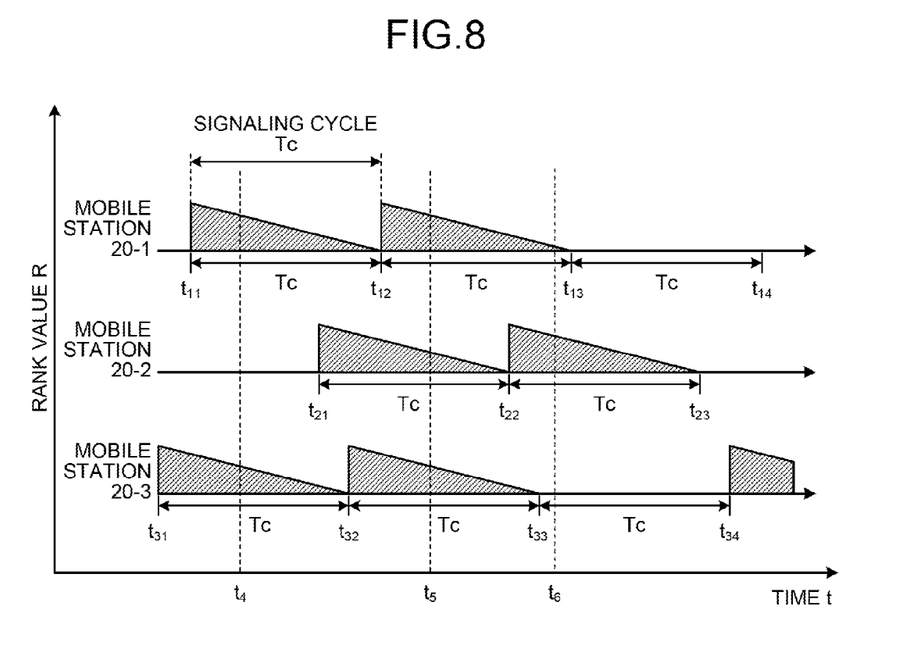
FIG. 8 is a diagram for explaining control of download according to the embodiment.

In contrast, in the control of download according to the embodiment as illustrated in FIG. 8, a rank value R is set in the y-axis direction. The communication control apparatus 10 sets 1 (ON) or 0 (OFF) based on whether the wireless communication quality of each of the mobile stations 20-1 to 20-3 at the set timing is equal to or greater than the threshold. For example, if the SIR is used as the wireless communication quality, and when the value of the SIR of the mobile station 20-1 at a set timing $t_{11}$ is equal to or greater than a threshold (for example, 0 decibel (dB)), the rank value R at the set timing $t_{11}$ is set to "1" as illustrated in FIG. 8. The rank value R of "1" set as described above is gradually decreased with time until a next set timing $t_{12}$. In contrast, when the value of the SIR of the mobile station 20-1 at the set timing is smaller than the threshold (for example, 0 dB) as in the case of a set timing $t_{13}$, the rank value R of "0" is maintained at least until a next set timing.

The rank values R of the other mobile stations 20-2 and 20-3 change similarly to the above. Specifically, as illustrated in FIG. 8, when the value of the SIR of the mobile station 20-2 at a set timing $t_{21}$ is equal to or greater than the threshold (for example, 0 dB), the rank value R at the set timing $t_{21}$ is set to "1". The set rank value R of "1" is gradually decreased with time until a next set timing $t_{22}$. In contrast, when the value of the SIR of the mobile station 20-2 at the set timing is smaller than the threshold (for example, 0 dB) as in the case of a set timing $t_{23}$, the rank value R of "0" is maintained at least until a next set timing.

The rank value R is gradually decreased according to the predetermined calculation formula as described above. The calculation formula is represented by, for example, Equation (1) below, where f(t) is a rank value at a time t and $T_c$ is a notification interval (signaling cycle) of the wireless communication quality.

$$f(t)=(T_c-t)/T_c \qquad (1)$$

Therefore, in the control of download according to the embodiment, it is possible to ensure a longer signaling cycle than that of the related control of download (see FIG. 7). Consequently, the frequencies of the signaling between each of the mobile stations 20-1 to 20-3 and the communication control apparatus 10 can be reduced.

Furthermore, the communication control apparatus 10 preferentially sets download-ON for the mobile stations with the higher rank values f(t) at the determination timing, so that even when the notification interval (signaling cycle) is lengthened, it becomes possible to control the download equally to control of download with a shorter notification interval. For example, as illustrated in FIG. 8, when a time $t_4$ is the determination timing, a rank value $f(t_4)$ of the mobile station 20-1 is greater than a rank value $f(t_4)$ of the mobile station 20-3. Furthermore, a rank value $f(t_4)$ of the mobile station 20-2 is "0". Therefore, the download-ON is set in the priority order of the mobile stations 20-1, 20-3, and 20-2.

Similarly, when a time $t_5$ is the determination timing, the descending order of rank values $f(t_5)$ is the mobile stations 20-1, 20-3, and 20-2. Therefore, the download destinations are set in the priority order of the mobile stations 20-1, 20-3, and 20-2. For another example, when a time $t_6$ is the determination timing, the descending order of rank values $f(t_6)$ is the mobile stations 20-2, 20-1, and 20-3. Therefore, the download-ON is set in the priority order of the mobile stations 20-2, 20-1, and 20-3.

Incidentally, the communication control apparatus 10 can adjust the behavior of the rank value R by applying other formulas as the predetermined calculation formula as described above. For example, if $f(t)=1-(t/T_c)^2$ (Equation (2)) is employed as the predetermined calculation formula, unlike the case with Equation (1) as described above, the communication control apparatus 10 can change the rank value R in a non-linear manner. As other calculation formulas, the communication control apparatus 10 may employ, for example, $f(t)=1-t/n\cdot T_c$ (Equation (3)) or $f(t)=1-(t/T_c)^n$ (Equation (4)) to lengthen the signaling cycle to further reduce the frequencies of the signaling. In contrast, the communication control apparatus 10 may employ, for example, $f(t)=1-nt/T_c$ (Equation (5)) to shorten the signaling cycle. Incidentally, n in Equations (3) to (5) is a natural number.

As described above, the communication control apparatus 10 according to the embodiment includes the communication quality determining unit 12, the rank value calculating unit 13, and the download control unit 15. The communication quality determining unit 12 acquires the wireless communication qualities of a plurality of mobile stations. The rank value calculating unit 13 calculates, for each of the mobile stations, a reference value (the rank value R) to determine a mobile station to be a data download destination by using the wireless communication qualities acquired by the communication quality determining unit 12. Furthermore, the rank value calculating unit 13 compares the values of the respective mobile stations at a first time point (the determination timing $t_4$, $t_5$, or $t_6$), and determines the mobile stations to be the download destinations in order from the mobile station with the highest value based on results of the comparison. The download control unit 15 downloads data to the mobile stations that are determined as the download destinations by the rank value calculating unit 13.

In the communication control apparatus 10, the communication quality determining unit 12 may determine whether each of the wireless communication qualities is equal to or greater than a predetermined threshold at a second time point (any of the set timings $t_{11}$ to $t_{14}$, $t_{21}$ to $t_{23}$, and $t_{31}$ to $t_{34}$), for each of the mobile stations. The rank value calculating unit 13 may set different values depending on results of the determination by the communication quality determining unit 12 for each of the mobile stations, and may update the set values along with time.

Furthermore, in the communication control apparatus 10, the rank value calculating unit 13 may set the value to "0" for the mobile stations whose wireless communication qualities at the second time point are smaller than the predetermined threshold, instead of setting the value to "1" for the mobile stations whose wireless communication qualities at the second time point are equal to or greater than the predetermined threshold. Moreover, the rank value calculating unit 13 may gradually decreases the set value of "1" to "0" along with time.

Furthermore, the mobile station 20 may calculate the rank values. In this configuration, the mobile station 20 includes the rank value calculating unit 24, the transmitting unit 25, and the receiving unit 21. The rank value calculating unit 24 calculates a reference value (the rank value R) to determine a mobile station to be a data download destination by using the wireless communication quality of the mobile station 20. The transmitting unit 25 transmits the value calculated by the rank value calculating unit 24 to the communication control apparatus 10. When the mobile station 20 is determined to be the download destination based on the above value at the first time point (the determination timing $t_4$, $t_5$, or $t_6$), the receiving unit 21 receives data downloaded from the communication control apparatus 10.

As described above, the communication control apparatus 10 generates the intermediate state in addition to the download-ON state and the download-OFF state, and preferentially allocates resources for download to the mobile stations in order from the mobile station with the highest rank value at a time point (determination timing) at which mobile stations to be download destinations are determined. When setting the intermediate state as described above, the communication control apparatus 10 sets the rank value to "1" when the wireless communication quality of the mobile station 20 at a timing at which the wireless communication quality is set is equal to or greater than the threshold, and sets to "0" when the wireless communication quality is smaller than the threshold. The communication control apparatus 10 gradually decreases the rank value of "1" until a next set timing (until the end of the signaling cycle). Therefore, the communication control apparatus 10 can reduce the frequencies of signaling and can optimally control download in order to improve the use efficiency of the wireless resources.

Incidentally, in the embodiment, the notification interval (signaling cycle) $T_c$ of the wireless communication quality is set to a constant value for all of the mobile stations. However, the notification interval $T_c$ may be changed adaptively for each of the mobile stations. For example, when the communication control apparatus 10 uses a travel speed of the mobile station as a parameter, because a temporal variation in the SIR decreases in a mobile station that travels at a slower speed, it is preferable to lengthen the notification interval $T_c$ for such a mobile station to reduce the temporal variation in the rank value f(t). In contrast, because the temporal variation in the SIR increases for a mobile station that travels at a faster speed, it is preferable for the communication control apparatus 10 to shorten the notification interval $T_c$ for such a mobile station to increase the temporal variation in the rank value f(t) in accordance with the temporal variation in the SIR. Furthermore, the parameter for setting a different notification interval $T_c$ for each of the mobile stations is not limited to the travel speed of the mobile station, but may be a degree of interference with other mobile stations, surrounding environment of the mobile station (for example, presence or absence of a shielding object or a reflective object), or the like.

Moreover, even in a single mobile station, the notification interval (signaling cycle) $T_c$ of the wireless communication quality may be adaptively changed along with time. For example, when the communication control apparatus 10 uses a travel speed of the mobile station as a parameter, because a temporal variation in the SIR decreases in a mobile station that travels at a slower speed, it is preferable to lengthen the notification interval $T_c$ for such a mobile station to reduce the temporal variation in the rank value f(t). In contrast, because the temporal variation in the SIR increases for the mobile station that travels at a faster speed, it is preferable for the communication control apparatus 10 to shorten the notification interval $T_c$ for such a mobile station to increase the temporal variation in the rank value f(t) in accordance with the temporal variation in the SIR. Furthermore, the parameter for setting a different notification interval $T_c$ for each of the mobile station is not limited to the travel speed of the mobile station, but may be a degree of interference with other mobile stations, surrounding environment of the mobile station (for example, presence or absence of a shielding object or a reflective object), or the like.

Moreover, regarding the threshold set to determine whether to set the rank value of "1" indicating download-ON for mobile stations, the communication control apparatus 10 uses a lower threshold for a mobile station located more distant from the base station in the embodiment. However, the communication control apparatus 10 may determine the initial value (0 or 1) of the rank value by using a constant threshold (for example, 0 dB) regardless of the distance from the base station. Alternatively, the communication control apparatus 10 may set the threshold and determine an initial rank value based on the threshold by using, as a reference, other parameters, such as the travel speed of the mobile station, the degree of interference with other mobile stations, presence or absence of a shielding object, or a quality of service (QOS) regardless of the distance from the base station.

Furthermore, in the descriptions of the embodiment, the mobile station 20 is assumed as a smartphone; however, the mobile station 20 is not limited to the smartphone. The present invention may be applied to various communication devices, such as a mobile phone or a personal digital assistant (PDA), capable of measuring the wireless communication quality. Moreover, the wireless communication quality is not limited to the SIR value, but may be a received signal strength indication (RSSI) value indicating the strength of radio waves, a signal to interference and noise ratio (SINR) value, a reference signal received power (RSRP) value, or a reference signal received quality (RSRQ) value. Alternatively, the wireless communication quality may be channel state information (CSI), such as channel quality indicator (CQI), a precoding matrix indicator (PMI), a rank indicator (RI), or a layer indicator (LI).

Furthermore, the initial rank value to be set when the wireless communication quality of each of the mobile stations is equal to or greater than the threshold is not limited to "1", but may be a value other than "1", such as "0.5" or "2". Moreover, the initial rank value is not always a constant value for all of the mobile stations that have provided the wireless communication qualities, but may be variably set by using the travel speed or the like of the mobile station as a parameter. For example, the rank value is less likely to vary for a mobile station whose travel speed is slower; therefore, the communication control apparatus 10 may set a smaller initial rank value of "0.5" for a mobile station whose wireless communication quality is equal to or greater than the threshold, to thereby suppress a variation in the rank value f(t). In contrast, the communication control apparatus 10 may set an initial rank value of "2" higher than "1" for a mobile station whose travel speed is faster, to thereby cause the rank value f(t) to easily vary. Moreover, the decreased value at the end of the signaling cycle need not always be "0" as long as the value is smaller than "1".

Furthermore, the communication control apparatus 10 need not always be an independent device as illustrated in FIG. 6, and may be incorporated in the content server 30 or the base station 40.

Moreover, the components of the communication control apparatus 10 illustrated in FIG. 1 do not necessarily have to be physically configured in the manner illustrated in the drawings. In other words, specific forms of distribution and integration of the apparatuses are not limited to those illustrated in the drawings, and all or part of the apparatuses can be functionally or physically distributed or integrated in arbitrary units depending on various loads or use conditions. For example, the rank value calculating unit 13 and the timing monitoring unit 14 of the communication control apparatus 10 may be integrated into one component or the communication quality determining unit 12 and the threshold DB 11 of the communication control apparatus 10 may be integrated into one component. For another example, the rank value calculating unit 13 may be distributed into a section for calculating the rank value R of each of the mobile stations at the determination timing and a section for selecting a mobile station as a download destination based on results of the comparison of the rank values R. Furthermore, the HDD 10d may be configured as an external apparatus of the communication control apparatus 10 and connected via the network or a cable.

According to an embodiment of the communication control apparatus of the present invention, it is possible to improve the use efficiency of the wireless resources.

All examples and conditional language provided herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A communication control apparatus comprising:
a memory; and
a processor coupled to the memory and configured to execute a process including:
acquiring wireless communication qualities of a plurality of mobile stations;
calculating, for each of the mobile stations, a reference value to determine mobile stations to be data download destinations by using the wireless communication qualities acquired by the acquiring;
comparing the reference values of the respective mobile stations at a first time point;
determining mobile stations to be the data download destinations in order from a mobile station whose reference value is the highest based on results of the comparison; and
downloading data to the mobile stations determined as the data download destinations by the determining, wherein the reference value is gradually decreased according to a predetermined calculation formula represented by f(t) that is a rank value at a time t and $T_c$ that is a notification interval of the wireless communication quality, the predetermined calculation formula being one of the following equations (1)-(3)

$$f(t)=1-t/n \cdot T_c \quad (1);$$

$$f(t)=1-(t/T_c)^n \quad (2); \text{ and}$$

$$f(t)=1-nt/T_c \quad (3),$$

n in Equations (1) to (3) being a natural number.

2. The communication control apparatus according to claim 1, wherein
the acquiring determines, for each of the mobile stations, whether each of the wireless communication qualities at a second time point is equal to or greater than a predetermined threshold, and the process further includes
setting a different value for each of the mobile stations depending on results of the determination obtained by the acquiring, and updates the set values along with time.

3. The communication control apparatus according to claim 2, wherein
the setting sets the reference value to one for a mobile station whose wireless communication quality at the second time point is equal to or greater than the predetermined threshold, sets the reference value to zero for a mobile station whose wireless communication quality at the second time point is smaller than the predetermined threshold, and decreases the set reference value of one to zero along with time.

4. A mobile station that performs communication with a communication control apparatus, the mobile station comprising:
a processor configured to execute a process including:
calculating a reference value to determine a mobile station to be a data download destination by using a wireless communication quality of the mobile station;
transmitting the reference value calculated at the calculating to the communication control apparatus; and receiving data downloaded from the communication control apparatus when the mobile station is determined as the data download destination based on the reference value at a first time point, wherein the reference value is gradually decreased according to a predetermined calculation formula represented by f(t) that is a rank value at a time t and $T_c$ that is a notification interval of the wireless communication quality, the predetermined calculation formula being one of the following equations (1)-(3)

$$f(t)=1-t/n \cdot T_c \quad (1);$$

$$f(t)=1-(t/T_c)^n \quad (2); \text{ and}$$

$$f(t)=1-nt/T_c \quad (3),$$

n in Equations (1) to (3) being a natural number.

5. A communication control method comprising:

acquiring wireless communication qualities of a plurality of mobile stations;

calculating, for each of the mobile stations, a reference value to determine mobile stations to be data download destinations by using the wireless communication qualities acquired at the acquiring;

comparing the reference values of the respective mobile stations at a first time point;

determining mobile stations to be the data download destinations in order from a mobile station whose reference value is the highest based on results of the comparison; and downloading data to the mobile stations determined as the data download destinations at the determining, wherein the reference value is gradually decreased according to a predetermined calculation formula represented by f(t) that is a rank value at a time t and $T_c$ that is a notification interval of the wireless communication quality, the predetermined calculation formula being one of the following equations (1)-(3)

$$f(t)=1-t/n \cdot T_c \quad (1);$$

$$f(t)=1-(t/T_c)^n \quad (2); \text{ and}$$

$$f(t)=1-nt/T_c \quad (3),$$

n in Equations (1) to (3) being a natural number.

\* \* \* \* \*